(12) United States Patent
Saikawa et al.

(10) Patent No.: US 10,025,052 B1
(45) Date of Patent: Jul. 17, 2018

(54) MULTIPLEXING LASER LIGHT SOURCE AND FIBER ADJUSTMENT METHOD

(71) Applicant: SHIMADZU CORPORATION, Kyoto (JP)

(72) Inventors: Jiro Saikawa, Kyoto (JP); Junki Sakamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/828,851

(22) Filed: Dec. 1, 2017

(51) Int. Cl.
*G02B 6/42* (2006.01)
*G02B 6/26* (2006.01)

(52) U.S. Cl.
CPC ........... *G02B 6/4296* (2013.01); *G02B 6/262* (2013.01); *G02B 6/4225* (2013.01); *G02B 6/4206* (2013.01); *G02B 6/4226* (2013.01)

(58) Field of Classification Search
None
See application file for complete search history.

(56) References Cited

U.S. PATENT DOCUMENTS

| | | | | |
|---|---|---|---|---|
| 6,044,188 A * | 3/2000 | Kropp | ................ | G02B 6/421 385/28 |
| 6,718,088 B2 * | 4/2004 | Okazaki | ............... | G02B 6/4204 372/6 |
| 7,400,794 B1 * | 7/2008 | Pang | .................... | G02B 6/262 385/123 |
| 7,502,533 B2 * | 3/2009 | Kirkpatrick | .......... | G02B 6/4206 385/29 |
| 9,195,006 B1 * | 11/2015 | Hoener | .................. | G02B 6/241 |
| 9,746,615 B2 * | 8/2017 | Saikawa | .................. | G02B 6/32 |
| 2007/0172174 A1 * | 7/2007 | Scerbak | ............... | G02B 6/4296 385/76 |
| 2012/0128299 A1 * | 5/2012 | Engelberth | .......... | G02B 6/4296 385/28 |
| 2013/0011102 A1 * | 1/2013 | Rinzler | ................ | G02B 6/3813 385/89 |
| 2013/0223792 A1 * | 8/2013 | Huber | .................. | B23K 26/073 385/18 |
| 2014/0355638 A1 * | 12/2014 | Berishev | .................. | G02B 6/32 372/75 |
| 2015/0362684 A1 * | 12/2015 | Seo | ...................... | G02B 6/4296 385/31 |

(Continued)

FOREIGN PATENT DOCUMENTS

JP 2002-202442 A 7/2002

*Primary Examiner* — Jerry Rahll
(74) *Attorney, Agent, or Firm* — Maier & Maier, PLLC

(57) ABSTRACT

A multiplexing laser light source which can easily couple a plurality of laser lights to a fiber having a core of such a size as to be difficult to align the laser lights therewith. The multiplexing laser light source includes: a plurality of semiconductor lasers, each of which outputs a laser light; a fiber having a core and a cladding, the fiber including a mode stripper mechanism configured to remove a cladding mode light on an incident side on which the laser light is incident; a coupling lens couples the laser lights emitted from the plurality of semiconductor lasers to the fiber by condensing the laser lights; an output monitor to monitor an output of the fiber; a ferrule attached to the incident side of the fiber and configured to absorb the cladding mode light; and a temperature monitor configured to monitor a temperature of the ferrule.

5 Claims, 1 Drawing Sheet

(56) References Cited

U.S. PATENT DOCUMENTS

2016/0109656 A1* 4/2016 Duesterberg .......... G02B 6/262
  385/29
2017/0017036 A1* 1/2017 Botheroyd ........... G02B 6/2856
2017/0082805 A1* 3/2017 Saikawa ................. G02B 6/42
2017/0292679 A1* 10/2017 Saikawa ............ G02B 19/0052

* cited by examiner

MULTIPLEXING LASER LIGHT SOURCE AND FIBER ADJUSTMENT METHOD

FIELD

The present invention relates to a multiplexing laser light source and a fiber adjustment method for multiplexing laser lights from a plurality of mutually independent light sources to achieve high brightness.

BACKGROUND

In the related art, as a method for achieving high output of a laser, a method of multiplexing a plurality of laser lights from a plurality of light sources to one optical fiber or the like (JP-A-2002-202442) and a method of bundling fibers to which a plurality of light sources are coupled and coupling them to a single fiber are known.

However, in the case of multiplexing to a single optical fiber having a value which is equal to or several times the value obtained by multiplying emitter sizes and beam divergence angles of a plurality of independent package type semiconductor lasers, it is not easy to efficiently couple a plurality of laser lights to a fiber having a core of such a size as to be difficult to align the laser lights therewith. Further, in such a case, since the plurality of laser lights are incident on a cladding and a cladding mode light propagates through the cladding, it is necessary to absorb the cladding mode light.

SUMMARY

An object of the present invention is to provide a multiplexing laser light source and a fiber adjustment method which can easily couple a plurality of laser lights to a fiber having a core of such a size as to be difficult to align the laser lights therewith and can absorb a cladding mode light.

In order to solve the above-mentioned problems, a multiplexing laser light source according to the present invention includes: a plurality of laser light sources, each of which outputs a laser light; a fiber having a core and a cladding, the fiber including a mode stripper mechanism configured to remove a cladding mode light on an incident side thereof on which the laser light is incident; a coupling lens configured to couple the laser lights emitted from the plurality of laser light sources to the fiber by condensing the laser lights; an output monitor configured to monitor an output of the fiber; a ferrule attached to the incident side of the fiber and configured to absorb the cladding mode light; and a temperature monitor configured to monitor a temperature of the ferrule, in which the ferrule is moved based on a temperature of the temperature monitor and an output of the output monitor.

According to the present invention, the fiber including the mode stripper mechanism for removing the cladding mode light on the incident side thereof on which the laser light is incident is used, and when the ferrule absorbs the cladding mode light while the laser light output is monitored by the output monitor, an increase in the temperature of the ferrule is monitored by the temperature monitor, and the ferrule is moved based on the temperature of the temperature monitor and the output of the output monitor. Therefore, it is possible to easily couple a plurality of laser lights to a fiber having a core of such a size as to be difficult to align the plurality of laser lights therewith. Further, since the cladding mode light or unnecessary light not coupled to the core is absorbed and reflection thereof is prevented, a damage due to the unnecessary light can be suppressed, and the ferrule serves as a heat radiator.

DETAILED DESCRIPTION

Embodiments of a multiplexing laser light source and a fiber adjustment method of the present invention will be described in detail below with reference to the drawings.

Figure 1:
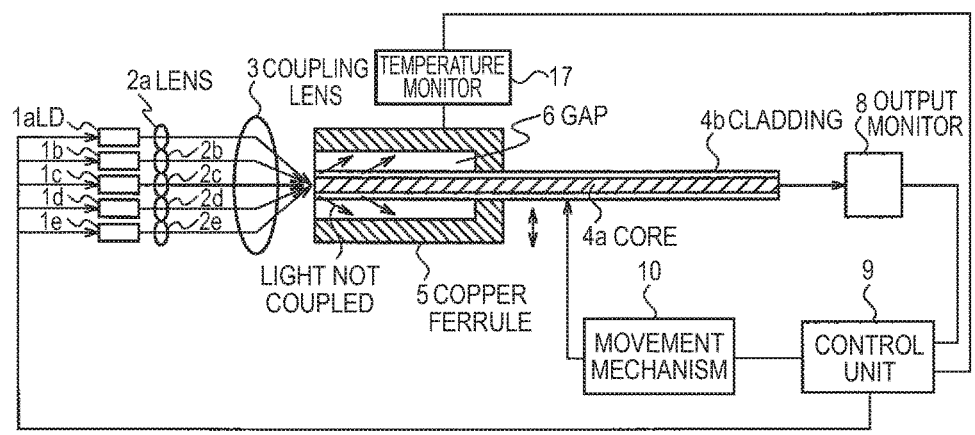
FIG. 1 is a diagram illustrating a configuration of a multiplexing laser light source according to a first embodiment of the present invention.

FIG. 1 is a diagram illustrating a configuration of a multiplexing laser light source according to a first embodiment. The multiplexing laser light source according to the first embodiment illustrated in FIG. 1 includes semiconductor lasers $1a$ to $1e$, lenses $2a$ to $2e$, a coupling lens 3, an optical fiber 4, a copper ferrule 5, a temperature monitor 7, an output monitor 8, a control unit 9, and a movement mechanism 10. Here, for each element number, a to e assigned as subscripts do not necessarily mean five pieces, but may be the number of pieces other than five pieces.

The semiconductor lasers $1a$ to $1e$ are arranged at predetermined intervals and excited by injecting carriers including electrons and holes injected by current drive, and output a laser light generated by induced emission generated when carrier pairs of the injected electrons and holes disappear. The semiconductor laser may be an array laser having a plurality of laser emission mechanisms in a bar-shaped semiconductor, or may be a laser which distributes light emission in a plane, such as a stack laser in which surface emitting lasers or bar-shaped array lasers are stacked.

As the semiconductor lasers $1a$ to $1e$, a semiconductor laser is used which outputs a laser light of 600 nm or less as a predetermined wavelength.

The lenses $2a$ to $2e$ are disposed at predetermined intervals so as to face the semiconductor lasers $1a$ to $1e$, and guide the laser lights from the semiconductor lasers $1a$ to $1e$ to the coupling lens 3. When a divergence angle of a beam is large as in the case of the semiconductor laser, it is preferable to adopt a collimating arrangement which can obtain a certain degree of parallel light. In the case of a laser with a small divergence angle, the lenses $2a$ to $2c$ are not necessarily required.

The coupling lens 3 functions as a condensing lens to multiplexes a plurality of laser lights from the semiconductor lasers $1a$ to $1e$ to the optical fiber 4 by condensing the laser lights.

The optical fiber 4 includes a core $4a$ having such a core size (for example, 100 μm or less) as to be difficult to align the laser lights therewith and a cladding $4b$ disposed outside the core $4a$. The optical fiber 4 guides a plurality of laser lights from the coupling lens 3 to the core $4a$ and the cladding $4b$ and transmits the laser light in the core $4a$ to an output end of the optical fiber 4.

Further, the optical fiber 4 includes a mode stripper mechanism (also referred to as a cladding mode stripper) for removing a cladding mode light on an incident side thereof on which the laser light is incident. In other words, the mode stripper mechanism includes a layer of high-refractive-index material disposed in contact with the cladding of the optical fiber 4 and optically coupled, and functions to output a cladding mode light propagating in the cladding 4b to the outside of the cladding 4b.

The copper ferrule 5 is attached to the incident side of the optical fiber 4 via a gap 6, and absorbs the cladding mode light from the cladding 4b via the gap 6. Since the copper ferrule 5 has a high degree of absorption of the laser light having a wavelength of 600 nm or less, temperature rise in the copper ferrule 5 is large. Instead of the copper ferrule 5, a ferrule such as gold and silver having a high absorption rate may be used.

The temperature monitor 7 includes, for example, a temperature sensor, and detects and monitors the temperature of the copper ferrule 5. The output monitor 8 is a photodiode or the like, disposed at a position facing an emitting end of the optical fiber 4, and monitors the laser light output from the optical fiber 4.

The control unit 9 outputs a movement control signal for maximizing an output of the output monitor 8 and minimizing a temperature of the temperature monitor 7 to the movement mechanism 10. The movement mechanism 10 moves the copper ferrule 5 in a three-dimensional direction (X direction, Y direction, Z direction orthogonal to one another) based on the movement control signal from the control unit 9.

Next, an operation of the multiplexing laser light source of the embodiment configured as described above will be described. First, a plurality of laser lights from the semiconductor lasers 1a to 1e are guided to the coupling lens 3 through the lenses 2a to 2e, condensed by the coupling lens 3, and multiplexed with the optical fiber 4.

The optical fiber 4 including the mode stripper mechanism for removing the cladding mode light on the incident side thereof on which the laser light is incident is used, and the cladding mode light incident on the cladding 4b passes through the gap 6 and is absorbed by the copper ferrule 5. Therefore, the temperature of the copper ferrule 5 rises.

The temperature monitor 7 monitors the temperature rise of the copper ferrule 5, and the output monitor 8 monitors the laser light output. The control unit 9 outputs the movement control signal for maximizing the output of the output monitor 8 and minimizing the temperature of the temperature monitor 7 to the movement mechanism 10.

The movement mechanism 10 adjusts a position of the optical fiber 4 by moving the copper ferrule 5 in a three-dimensional direction (X direction, Y direction, Z direction orthogonal to one another) based on the movement control signal from the control unit 9. Therefore, the output of the output monitor 8 becomes maximized and the temperature of the temperature monitor 7 becomes minimized. That is, it is possible to easily couple the plurality of laser lights to the fiber having a core of such a size as to be difficult to align the laser lights therewith.

Further, since the cladding mode light or unnecessary light not coupled to the core is absorbed and reflection thereof is prevented, a damage due to the unnecessary light can be suppressed. Further, the copper ferrule 5 can serve as the heat radiator.

Figure 2:
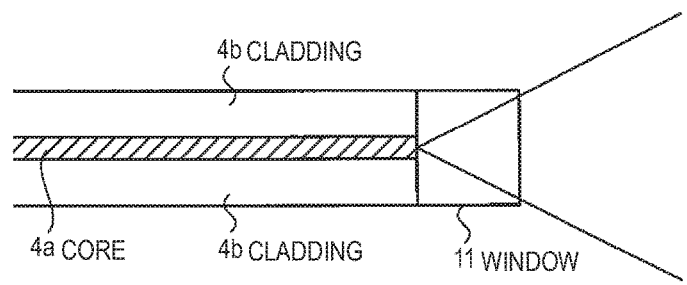
FIG. 2 is a view illustrating a window attached to a tip of an optical fiber of the multiplexing laser light source of the first embodiment of the present invention.

Further, when a power density of the laser light becomes larger than a predetermined level, as illustrated in FIG. 2, a window 11 is attached to an end face of the optical fiber 4, and the power density of the laser light may be lowered by the window 11.

The control unit 9 may stop the semiconductor lasers 1a to 1e, when the temperature monitored by the temperature monitor 7 exceeds a predetermined value, that is, when the temperature becomes abnormal.

Although the case of the semiconductor laser has been described as an example of the laser light source in the present disclosure, the laser light source may be also implemented with a plurality of ordinary laser devices or any laser light source showing a discrete state, such as a laser light flux obtained by bundling a plurality of fibers.

The multiplexing laser light source according to the present invention is particularly applicable to a laser processing apparatus, laser lighting, a laser exposure apparatus, excitation of fluorescent material, laser measurement, laser medical treatment, and the like.

What is claimed is:

1. A multiplexing laser light source, comprising:
   a plurality of laser light sources, each of which outputs a laser light;
   a fiber having a core and a cladding, the fiber including a mode stripper mechanism configured to remove a cladding mode light on an incident side thereof on which the laser light is incident;
   a coupling lens configured to couple the laser lights emitted from the plurality of laser light sources to the fiber by condensing the laser lights;
   an output monitor configured to monitor an output of the fiber;
   a ferrule attached to the incident side of the fiber and configured to absorb the cladding mode light; and
   a temperature monitor configured to monitor a temperature of the ferrule,
   wherein the ferrule is moved based on a temperature of the temperature monitor and an output of the output monitor.

2. The multiplexing laser light source according to claim 1, wherein each of the plurality of laser light sources outputs a laser light having a predetermined wavelength or less, and
   wherein the ferrule is made of a copper ferrule having a high absorption of the predetermined wavelength.

3. The multiplexing laser light source according to claim 1, further comprising a control unit configured to move the ferrule so as to maximize the output of the output monitor and minimize the temperature of the temperature monitor.

4. The multiplexing laser light source according to any one of claim 1, wherein a window configured to adjust a power density of the laser light is attached to an end face of the fiber.

5. A fiber adjustment method, comprising:
   preparing a fiber having a core and a cladding, the fiber including a mode stripper mechanism configured to remove a cladding mode light on an incident side thereof on which a laser light is incident;
   coupling laser lights emitted from a plurality of laser light sources to the fiber by using a coupling lens to condense the laser lights;
   monitoring an output of the fiber by an output monitor;
   absorbing the cladding mode light by a ferrule attached to the incident side of the fiber;
   monitoring a temperature of the ferrule by a temperature monitor;
   adjusting a position of the fiber by moving the ferrule based on a temperature of the temperature monitor and an output of the output monitor; and
   coupling the laser lights emitted from the plurality of laser light sources to the fiber.

\* \* \* \* \*